Nov. 22, 1949  E. G. HALBY  2,488,908
EXCAVATING MACHINE
Filed Aug. 14, 1946  3 Sheets-Sheet 1
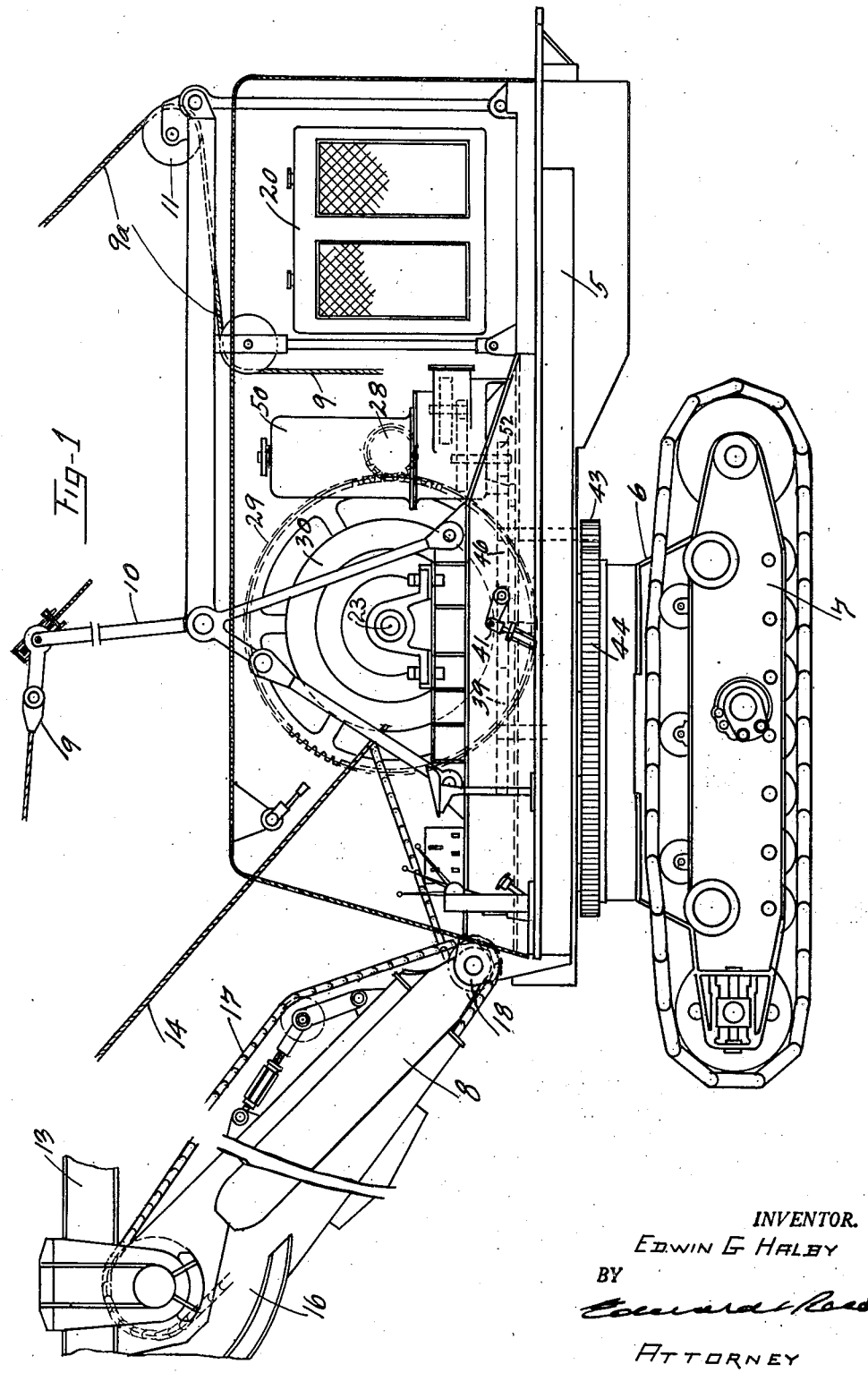
INVENTOR.
EDWIN G. HALBY
BY
Edward Reed
ATTORNEY

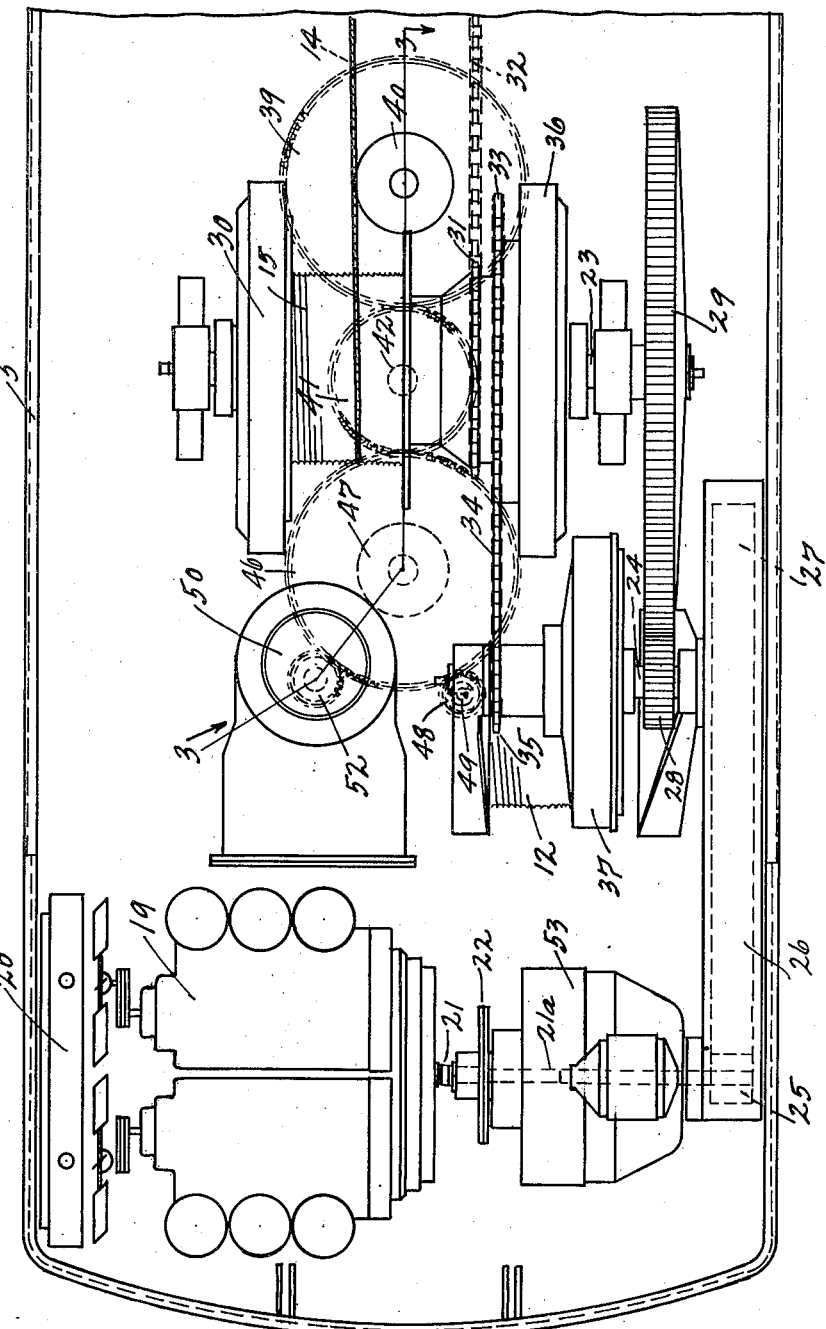

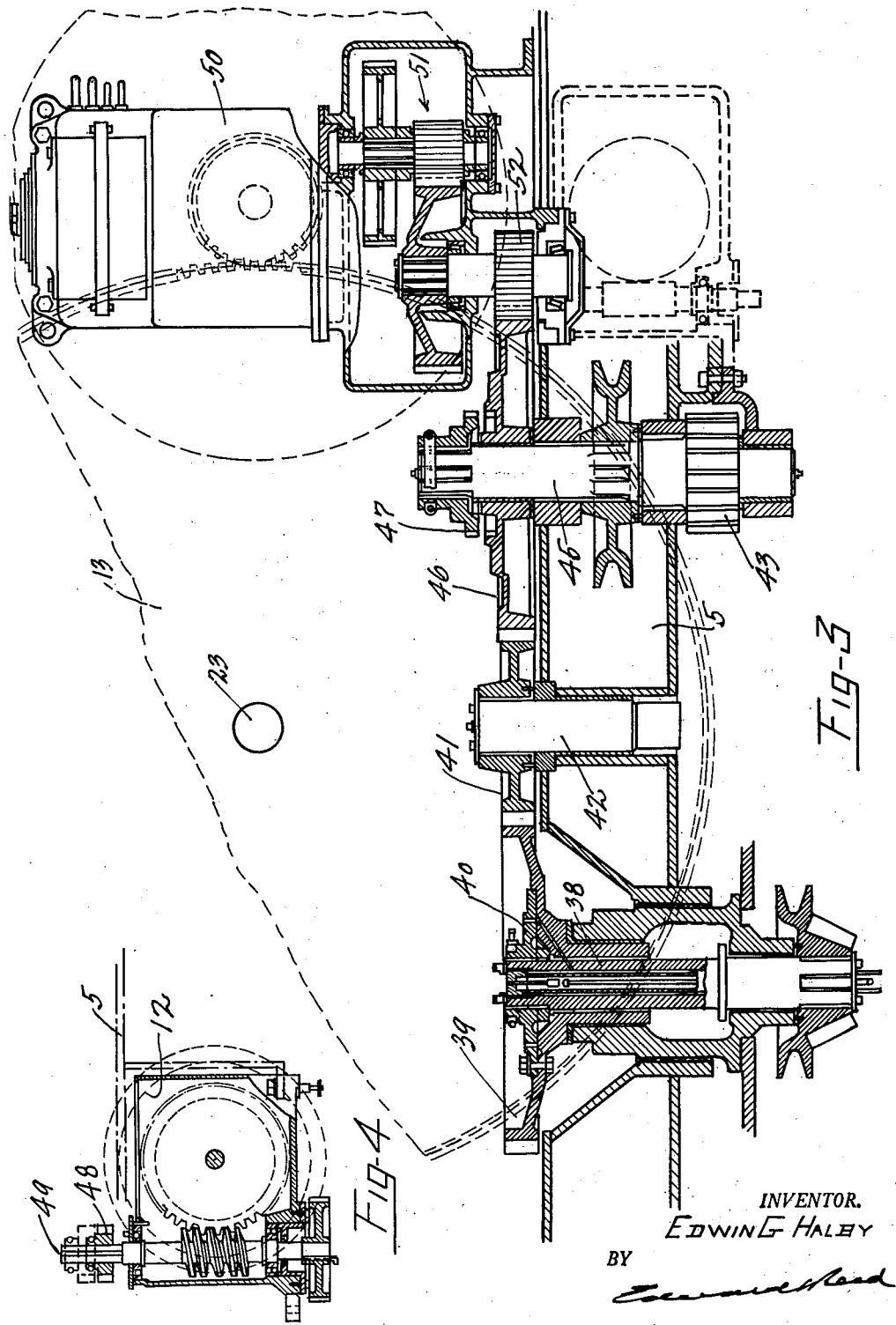

Patented Nov. 22, 1949

2,488,908

UNITED STATES PATENT OFFICE 2,488,908

EXCAVATING MACHINE

Edwin G. Halby, Marion County, Ohio, assignor to Marion Power Shovel Company, Marion, Ohio, a corporation of Ohio Application August 14, 1946, Serial No. 690,528

10 Claims. (Cl. 214—135)

This invention relates to an excavating machine and more particularly to the transmission of power to the various operating mechanisms of a power shovel or similar machine.

The ordinary power shovel comprises a platform rotatably supported on suitable traction devices by which it may be propelled from place to place. On the platform is a power plant to provide the power necessary to the operations of the various mechanisms, such as propelling mechanism, platform rotating mechanism, dipper, or shovel, hoisting mechanism, dipper crowding mechanism and boom hoisting mechanism. It has been customary heretofore to transmit power to these mechanisms through friction clutches, commonly called "frictions." Friction clutches, although commonly used for this purpose, are not entirely satisfactory. For example, in accelerating or decelerating a load the clutch members necessarily slip one on the other and this slipping generates heat which results in the expansion and contraction of the friction material and may, and often does, adversely affect the operation of the clutch, as well as the friction material, as by causing distortion, affecting adjustment, changing the coefficient of friction and shortening the useful life of the friction material. The friction material is also adversely affected by water, oil and even atmospheric conditions.

One object of the invention is to eliminate friction clutches from the power transmission as far as is practicable.

A further object of the invention is to provide a power transmission system in which the power is transmitted directly from an engine to a part of the operating mechanism and is transmitted to another part of the operating mechanism through gears and positive clutches, the gears being driven by an electric motor.

A further object of the invention is to provide such a transmission system in which the gear train occupies a minimum of space and is so located on the platform that it does not interfere with other mechanisms thereon.

A further object of the invention is to provide such a transmission system which is simple in construction and operation.

Other objects of the invention may appear as the mechanism is described in detail.

In the accompanying drawings Fig. 1 is a side elevation of a power shovel embodying the invention, and partly broken away; Fig. 2 is a plan view of the platform and mechanisms mounted thereon, with the platform partly broken away; Fig. 3 is a section taken on the line 3—3 of Fig. 2; and Fig. 4 is a detail view of the driving connections for the boom hoist mechanism.

In these drawings I have illustrated a preferred embodiment of the invention and have shown the same as installed on a power shovel, but it is to be understood that the mechanism may take various forms and may be installed on machines of different character, without departing from the spirit of the invention.

The general construction of the power shovel here illustrated is more or less conventional, and it comprises a platform 5 rotatably mounted on a base 6 which is movably supported by crawling track devices 7. A boom 8 extends upwardly and forwardly from the forward end of the platform and is supported at the desired inclination by a cable 9 which is connected with the point of the boom, not shown, and with the upwardly extending movable member 10 of a gantry. A cable 9a connected with the member 10 extends rearwardly and downwardly about a sheave 11 to a boom hoisting drum 12, as shown in Fig. 2. Mounted on the boom 8 for both pivotal and longitudinal movements with relation thereto is a dipper handle 13 which carries at its outer end the usual dipper, or shovel, not here shown. The dipper is hoisted, that is, moved upwardly about the pivotal axis of the dipper handle, by a hoisting cable 14 which extends from the bail of the dipper about a sheave at the point of the boom, not shown, to a hoisting drum 15 on the platform. Longitudinal movement is imparted to the dipper handle, to force, or crowd, the dipper into the material to be moved, by a crowding mechanism shown conventionally at 16, and including a sprocket chain 17 which extends about a sprocket wheel 18 mounted on the platform adjacent the foot of the boom. The sprocket wheel 18 is actuated by a device mounted on the platform, as will be hereinafter explained.

Mounted on the platform 5, preferably adjacent the rear end thereof, is a power plant which may be of any suitable kind and is here shown as an internal combustion engine 19 of the twin type, which is provided with a radiator 20. Connected with the shaft 21 of the engine in line therewith, as by a flexible coupling 22, is the driving shaft 21a of an electric generator 53, the generator shaft extending beyond the generator and having mounted on the outer end portion thereof a sprocket wheel 25. A drum shaft 23 is mounted on the platform in forwardly spaced and parallel relation to the engine shaft, and interposed between and parallel with the engine shaft and the drum shaft is a clutch shaft 24. The clutch shaft 24 is driven from the engine by a sprocket chain 26 which extends about the sprocket wheel 25 on the generator shaft 21a and about a sprocket wheel 27 on the clutch shaft 24, and a pinion 28 rigidly secured to the clutch shaft meshes with a gear 29 rigidly secured to the drum shaft. The dipper hoisting drum 15 is rotatably supported on the drum shaft, and a friction clutch 30 is provided to drivingly connect the same with the drum shaft. Also rotatably mounted on the drum shaft is a device for actuating the dipper crowding mechanism, which is here shown as comprising a sprocket wheel 31 connected by a chain 32 with a sprocket wheel, not shown, which is drivingly connected with the sprocket wheel 18 of the crowding mechanism. A second sprocket wheel, 33 rigidly connected with the sprocket wheel 31, is connected by a chain 34 with a sprocket wheel 35 rotatably supported on the clutch shaft 24. Friction clutches 36 and 37 serve respectively to drivingly connect the actuating device for the crowding mechanism with the drum shaft and to connect the sprocket wheel 35 with the clutch shaft. Thus both the hoisting mechanism and the crowding mechanism for the dipper are selectively driven directly from the engine through friction clutches.

The shovel is propelled from one position to another through propelling mechanism which includes a vertical propelling shaft 38 at the axis of rotation of the platform and which projects above the platform. Mounted on the projecting upper end of the shaft 38 close to the platform is a horizontal gear 39 which may be connected with and disconnected from the shaft 38 by a positive clutch, such as a jaw clutch 40. Meshing with the gear 39 is an idler gear 41 which is freely rotatable on a stud 42 which is mounted on and projects above the platform 5. Rotating or swinging movement is imparted to the platform by a pinion 43 carried by the platform and meshing with a large gear 44 mounted on the base 6 concentric with the axis of rotation of the platform. In the present arrangement this pinion is rigidly secured to the lower portion of a vertical shaft 45 which extends through the platform 5 and projects below the same to receive the pinion 43 and projects above the platform to receive a gear 46 which is rotatably mounted on the shaft and meshes with the idler gear 41. A positive clutch 47 is provided for connecting the gear 46 with the shaft 45. The boom hoisting drum 12 is rotated by suitable mechanism including a gear 48 mounted on a vertical shaft 49, above the platform, and is adapted to mesh with the horizontal gear 46. The gear 48 is here shown as splined on the shaft for movement into and out of mesh with the gear 46, but obviously it could be connected with the shaft by a clutch, as are gears 40 and 46.

The train of horizontal gears above described is driven by an electric motor 50 with which is connected a train of reducing gearing 51, the end gear 52 of which is supported in a horizontal position just above the platform and is in constant mesh with the horizontal gear 46. Thus by a proper adjustment of the positive clutches 40 and 47 and of the gear 48, either the platform rotating mechanism, the propelling mechanism or the boom hoist mechanism may be individually connected with and operated by the electric motor 50. In the drawings the gear 39 is shown as clutched to the propelling shaft 38, the gear 46 is disconnected from the platform rotating shaft 45, and the gear 48 is out of mesh with the gear 46, so that the propelling mechanism will be driven from the electric motor, and the platform rotating mechanism and the boom hoist mechanism will remain idle.

The electric motor 50 is energized by current from the electric generator 53, which is driven by the engine 19. Thus the engine, which supplies all power required for operating the power shovel, drives the dipper hoist mechanism and the crowding mechanism through direct connections, including the shafts 21 and 21a and the friction clutches, and it also drives the generator which supplies current to the electric motor to actuate the horizontal gear train which is adapted to be selectively connected with the propelling mechanism, the rotating mechanism or the boom hoist mechanism. The train of gears being mounted in horizontal positions close to the platform occupies a minimum of space and extends beneath parts of the mechanisms which are supported on the platform. Further, the transmission of the electrically generated power to the several operating mechanisms is effected by a simple train of gears which are easily installed, and the arrangement is such that an ordinary power shovel can be easily converted to the present type of power transmission.

While I have shown and described one embodiment of my invention, I wish it to be understood that I do not desire to be limited to the details thereof as various modifications may occur to a person skilled in the art.

Having now fully described my invention, what I claim as new and desire to secure by Letters Patent, is:

1. An excavating machine comprising a platform, a plurality of operating mechanisms on said platform, an engine on said platform, means including friction clutches for selectively establishing direct driving connection between a part of said operating mechanisms and said engine, an electric motor on said platform, and means including a plurality of gears and positive clutches for selectively connecting other of said operating mechanisms with said electric motor.

2. An excavating machine comprising a platform, a plurality of operating mechanisms on said platform, an engine on said platform, means including friction clutches for selectively establishing direct driving connection between a part of said operating mechanisms and said engine, an electric motor on said platform, means including a plurality of gears and positive clutches for selectively connecting other of said operating mechanisms with said electric motor, and a generator on said platform and driven by said engine to supply current to said electric motor.

3. In an excavating machine comprising a rotatable platform, dipper hoisting mechanism, dipper crowding mechanism, propelling mechanism and platform rotating mechanism; an engine on said platform, selective means including friction clutches for drivingly connecting said hoisting mechanism and said crowding mechanism with said engine, an electric motor on said platform, means including gears and positive clutches for selectively connecting said propelling mechanism and said rotating mechanism with said electric motor, and a generator driven by said engine for supplying current to said electric motor.

4. In an excavating machine comprising a rotatable platform, dipper hoisting mechanism, dipper crowding mechanism, propelling mechanism and platform rotating mechanism; an engine on said platform, selective means including friction elements for drivingly connecting said hoisting mechanism and said crowding mechanism with said engine, an electric motor on said platform, a plurality of intermeshing gears driven by said electric motor, selective means for positively connecting two of said gears respectively with said propelling mechanism and said rotating mechanism, and a generator driven by said engine for supplying current to said motor.

5. In a excavating machine comprising a rotatable platform, dipper hoisting mechanism, dipper crowding mechanism, propelling mechanism, platform rotating mechanism and boom hoisting mechanism; an engine on said platform, selective means including friction elements for drivingly connecting said hoisting mechanism and said crowding mechanism with said engine, an electric motor on said platform, a plurality of intermeshing gears driven by said motor, selective means for positively connecting two of said gears respectively with said propelling mechanism and said rotating mechanism, a gear for actuating said boom hoisting mechanism, operable means for positively connecting the last-mentioned gear with one of the first-mentioned gears, and a generator driven by said engine for supplying current to said motor.

6. In an excavating machine comprising a rotatable platform, a dipper hoisting drum on said platform, dipper crowding mechanism including a part on said platform, propelling mechanism including a vertical shaft extending above said platform, and platform rotating mechanism including a vertical shaft extending above said platform; an engine on said platform, means including friction elements for drivingly connecting said hoisting drum and said crowding mechanism with said engine, an electric motor on said platform, a horizontal gear train including gears mounted on the respective vertical shafts and a gear connected with said motor, selective means for positively connecting the first-mentioned gears with said shafts, and a generator driven by said engine for supplying current to said motor.

7. In an excavating machine a platform, an engine on said platform having a shaft, a drum shaft, a driving connection between said engine shaft and said drum shaft, a drum on said drum shaft, a rotatable actuating device on said drum shaft, separately operable friction clutches to selectively connect said drum and said actuating device with said drum shaft, a plurality of vertical shafts extending above said platform and connected with separate mechanisms to be operated, horizontal gears mounted on said vertical shafts and having geared connection one with the other, clutch means for positively connecting said gears with the respective shafts, an electric motor on said platform, a gear connected with said electric motor and meshing with one of said horizontal gears, and a generator driven by said engine to supply current to said electric motor.

8. In an excavating machine a rotatable platform, an engine on said platform having a horizontal shaft, a clutch shaft and a drum shaft parallel with and spaced from said engine shaft, a positive driving connection between said engine shaft and said clutch and drum shafts, a dipper hoisting drum on said drum shaft, a friction clutch to connect said drum with said drum shaft, a rotatable device on said drum shaft to actuate a dipper crowding mechanism, a friction clutch to connect said actuating device with said drum shaft for rotation thereby in one direction, means including a friction clutch on said clutch shaft to rotate said actuating device in the other direction, a vertical propelling shaft extending through said platform, a gear on said propelling shaft, a positive clutch to connect said gear with said propelling shaft, an idler gear meshing with said propelling gear, a vertical platform rotating shaft extending through said platform, a gear on said platform rotating shaft meshing with said idler gear, a positive clutch to connect the last-mentioned gear with said platform rotating shaft, an electric motor on said platform, reducing gearing connected with said motor and including a gear meshing with said platform rotating gear, a generator to supply current to said electric motor, and a driving connection between said generator and said engine shaft.

9. In an excavating machine a rotatable platform, an engine on said platform having a horizontal shaft, a clutch shaft and a drum shaft parallel with and spaced from said engine shaft, a positive driving connection between said engine shaft and said clutch and drum shafts, a dipper hoisting drum on said drum shaft, a friction clutch to connect said drum with said drum shaft, a rotatable device on said drum shaft to actuate a dipper crowding mechanism, a friction clutch to connect said actuating device with said drum shaft for rotation thereby in one direction, means including a friction clutch on said clutch shaft to rotate said actuating device in the other direction, a vertical propelling shaft extending through said platform, a gear on said propelling shaft, a positive clutch to connect said gear with said propelling shaft, an idler gear meshing with said propelling gear, a vertical platform rotating shaft extending through said platform, a gear on said platform rotating shaft meshing with said idler gear, a positive clutch to connect the last-mentioned gear with said platform rotating shaft, an electric motor on said platform, reducing gearing connected with said motor and including a gear meshing with said platform rotating gear, a boom hoist shaft extending through said platform, a gear on said boom hoist shaft movable into and out of mesh with said platform rotating gear, a generator to supply current to said electric motor, and a driving connection between said generator and said engine shaft.

10. In an excavating machine, a rotatable platform, an engine on said platform having a horizontal shaft, a clutch shaft and a drum shaft parallel with and spaced from said engine shaft, a positive driving connection between said engine shaft and said clutch and drum shafts, a dipper hoisting drum on said drum shaft, a friction clutch to connect said drum with said drum shaft, a vertical propelling shaft extending through said platform, a gear on said propelling shaft, a positive clutch to connect said gear with said propelling shaft, an idler gear meshing with said propelling gear, a vertical platform rotating shaft extending through said platform, a gear on said platform rotating shaft meshing with said idler gear, a positive clutch to connect the last mentioned gear with said platform rotating shaft, an electric motor on said platform, reducing gearing connected with said motor and including a gear meshing with said platform rotating gear, a generator to supply current to said electric motor, and a driving connection between said generator and said engine shaft.

EDWIN G. HALBY.

REFERENCES CITED

The following references are of record in the file of this patent:

UNITED STATES PATENTS

| Number | Name | Date |
| --- | --- | --- |
| 1,929,004 | Pugh | Oct. 3, 1933 |
| 2,003,688 | Hathaway | June 4, 1935 |
| 2,083,460 | Ljungkull | June 8, 1937 |
| 2,354,863 | Huston | Aug. 1, 1944 |
| 2,370,856 | Gray | Mar. 6, 1945 |